(12) United States Patent
Rim (10) Patent No.: US 9,284,013 B2
(45) Date of Patent: Mar. 15, 2016

(54) UPRIGHT THREE-WHEELED VEHICLE HAVING SUSPENSION MEANS

(71) Applicant: Jin Wook Rim, Seoul (KR)

(72) Inventor: Jin Wook Rim, Seoul (KR)

(*) Notice: Subject to any disclaimer, the term of this patent is extended or adjusted under 35 U.S.C. 154(b) by 0 days.

(21) Appl. No.: 14/650,088

(22) PCT Filed: Dec. 5, 2013

(86) PCT No.: PCT/KR2013/011210
§ 371 (c)(1),
(2) Date: Jun. 5, 2015

(87) PCT Pub. No.: WO2014/088337
PCT Pub. Date: Jun. 12, 2014

(65) Prior Publication Data
US 2015/0314828 A1    Nov. 5, 2015

(30) Foreign Application Priority Data

Dec. 6, 2012  (KR) .................. 10-2012-0141090

(51) Int. Cl.
*B62K 5/02* (2013.01)
*B62K 25/04* (2006.01)
*B62K 5/00* (2013.01)

(52) U.S. Cl.
CPC . *B62K 25/04* (2013.01); *B62K 5/02* (2013.01); *B62K 2005/001* (2013.01)

(58) Field of Classification Search
CPC ..... B62K 25/04; B62K 5/02; B62K 2005/001
USPC ................................................. 280/87.041
See application file for complete search history.

(56) References Cited

U.S. PATENT DOCUMENTS

| 2,251,005 | A | * | 7/1941 | Rubinich | B62K 3/002 188/2 R |
| 3,937,486 | A | * | 2/1976 | Weiters | B62K 5/02 280/124.103 |
| 4,909,538 | A | * | 3/1990 | Langton | B62K 5/02 280/124.103 |
| 4,972,920 | A | * | 11/1990 | Zamitter | B60G 11/02 180/219 |
| 5,294,140 | A | * | 3/1994 | Rinkewich | B62K 3/002 280/221 |
| 5,328,193 | A | * | 7/1994 | Shiew | B62K 3/002 280/62 |
| 6,299,186 | B1 | * | 10/2001 | Kao | B62K 3/002 280/11.28 |
| 7,090,234 | B2 | | 8/2006 | Takayanagi et al. | |

(Continued)

FOREIGN PATENT DOCUMENTS

| AT | WO 2011109851 A1 | * | 9/2011 | ............. B62K 3/002 |
| DE | 102007036237 A1 | * | 2/2009 | ............. B62K 3/002 |

(Continued)

*Primary Examiner* — Paul N Dickson
*Assistant Examiner* — Bridget Avery
(74) *Attorney, Agent, or Firm* — Rabin & Berdo, P.C.

(57) ABSTRACT

An upright three-wheeled vehicle. A footboard part is disposed between and connected to a pair of rear wheel parts, and has a space section therein. A frame connects a front section of the footboard part to a front wheel part. A handlebar part extends upward from the frame. A suspension includes a first link perpendicularly connected to a drive shaft of a corresponding rear wheel part to initially reduce delivery of shocks by rotating and reciprocating in a lateral direction when the rear wheel part moves up and down, a second link perpendicularly bent from the first link and accommodated within the space section in a rear frame of the footboard part to secondarily reduce the shocks, and an elastic member disposed on the second link to absorb the shocks depending on a direction of the shocks applied to the rear wheel part.

4 Claims, 7 Drawing Sheets

(56) References Cited

U.S. PATENT DOCUMENTS

| | | | |
|---|---|---|---|
| 2004/0026883 A1* | 2/2004 | Chen | B62J 6/12 280/87.041 |
| 2004/0035628 A1* | 2/2004 | Takayanagi | B62K 5/027 180/210 |
| 2004/0040770 A1* | 3/2004 | Takayanagi | B62K 25/04 180/210 |
| 2004/0119259 A1 | 6/2004 | Takayanagi et al. | |
| 2005/0184485 A1* | 8/2005 | Timmermans | B62D 63/061 280/656 |
| 2007/0262504 A1* | 11/2007 | Varrone | B60G 7/02 267/154 |

FOREIGN PATENT DOCUMENTS

| | | | | |
|---|---|---|---|---|
| DE | 202011050506 U1 | * | 8/2011 | B62K 3/002 |
| DE | 202013006279 U1 | * | 10/2013 | B62M 1/00 |
| DE | 102013003886 A1 | * | 8/2014 | B62K 5/02 |
| JP | 51-011536 U | | 1/1976 | |
| JP | 06-344970 A | | 12/1994 | |
| JP | 2004-122870 A | | 4/2004 | |
| KR | 20-0283894 Y1 | | 7/2002 | |
| KR | 10-2012-0083129 A | | 7/2012 | |
| WO | WO 2012130598 A1 | * | 10/2012 | B62K 3/002 |

* cited by examiner

UPRIGHT THREE-WHEELED VEHICLE HAVING SUSPENSION MEANS

TECHNICAL FIELD

The present invention relates to a three-wheeled vehicle. More particularly, the present invention relates to an upright three-wheeled vehicle having separate suspensions independently provided on both sides of a footboard part on which a rider stands in an upright position in order to protect the rider from shocks from the road during traveling, thereby improving safety and increasing ride quality.

BACKGROUND ART

Recently, a variety of long-range and short-range vehicles have been distributed.

Examples of the vehicles include bicycles that are propelled to ride in response to the pedaling of riders and motorcycles or cars that are driven using fossil fuels or electricity.

Also provided are upright three-wheeled vehicles that operate using electrical power to transport an upright rider in a simple manner. An example thereof was disclosed in Korean Registered Utility Model No. 20-0283894.

Figure 1:
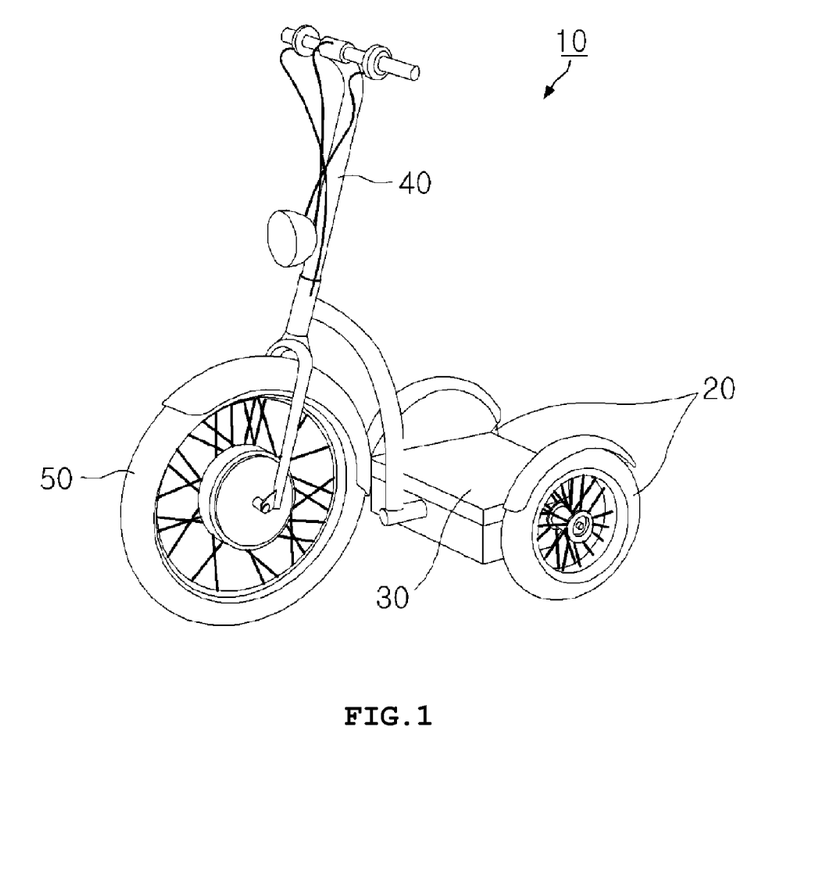
FIG. 1 and FIG. 2 are perspective and side-elevation views illustrating an upright three-wheeled vehicle of the related art.
Figure 2:
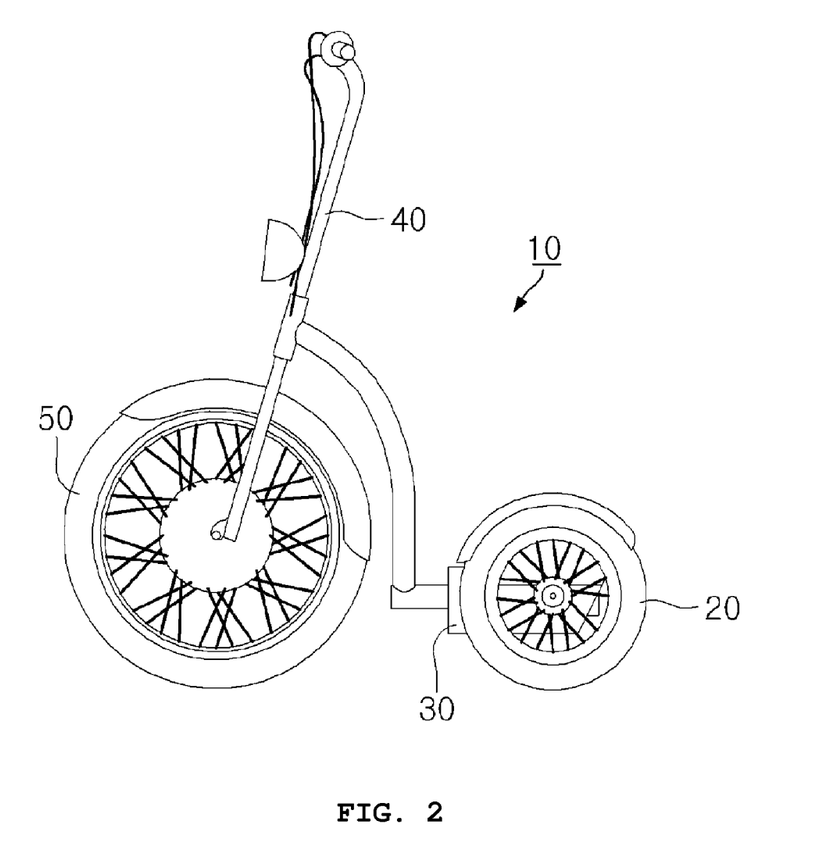

FIG. 1 and FIG. 2 are perspective and side-elevation views illustrating an upright three-wheeled vehicle of the related art. As illustrated in these figures, the upright three-wheeled vehicle 10 of the related art includes rear wheel parts 20, a footboard part 30, a handlebar part 40, and a single front wheel part 50. The rear wheel parts 20 are disposed on both sides such that the rear wheel parts 20 face each other. The footboard part 30 is disposed between the rear wheel parts 20, allowing a user to stand thereon in an upright position. The handlebar part 40 is connected to the footboard part 30, and is grasped by the user in the upright position. The front wheel part 50 is connected to the handlebar part 40 such that the front wheel part 50 is steered in the lateral direction. The front wheel part 50 is disposed in a position corresponding to the middle of the rear wheels.

When the user standing in an upright position on the footboard part 30 starts the upright three-wheeled vehicle and operates the levers, the front wheel part 50 and the rear wheel parts 20 operate, causing the vehicle to travel. In this state, the user drives the vehicle to an intended place by controlling the traveling direction by turning the handlebar part 40 in the lateral direction.

However, in the upright three-wheeled vehicle 10 of the related art, the footboard part on which the rider stands in the upright position is directly connected to a frame that surrounds the rear wheels. Shocks from the road during traveling are delivered to the footboard part without being properly absorbed.

Specifically, when the rider on the upright three-wheeled vehicle 10 of the related art travels over a road having irregular surfaces, such as a dirt road, or hits a hole or a raised spot, the rear wheel parts suddenly or quickly move up and down. Shocks caused by such upward and downward motions are delivered to the footboard part without being absorbed. The shocks are subsequently delivered to the rider standing on the footboard in the erected position, causing an excessive load to the joint, the waist, and the like of the rider. There are worries in that such excessive loads may be harmful to the health of the rider or injure the rider.

In addition, there are problems in that such shocks significantly decrease ride quality, thereby lowering customer satisfaction and causing the rider to get tired easily.

DISCLOSURE

Technical Problem

The present invention has been made keeping in mind the above problems occurring in the related art, and the present invention is intended to provide an upright three-wheeled vehicle having separate suspensions independently provided on both sides of a footboard part on which a rider stands in an upright position in order to protect the rider from shocks from the road during traveling, thereby improving safety as well as improving customer satisfaction by increasing ride quality.

Technical Solution

In order to achieve the above object, according to an aspect of the present invention, an upright three-wheeled vehicle includes: a pair of rear wheel parts disposed on both sides, the rear wheel parts facing each other; a footboard part disposed between and connected to the pair of rear wheel parts, allowing a rider to put both feet thereon in an upright position, the footboard part having a space section of a predetermined size formed in a lateral direction within the footboard part; a frame connecting a front section of the footboard part to a single front wheel part; a handlebar part extending upward from the frame, the handlebar part controlling a direction in which the front wheel part rotates; and suspensions, each of the suspensions comprises: a first link perpendicularly connected to a drive shaft of a corresponding rear wheel part of the pair of rear wheel parts, the first link initially reducing delivery of shocks by rotating and reciprocating in a lateral direction when the rear wheel part moves up and down; a second link perpendicularly bent from the first link, the second link being accommodated within the space section in a rear frame of the footboard part, the second link secondarily reducing the shocks by absorbing a portion of the shocks directed to the footboard part; and an elastic member disposed on the second link, the elastic member being in close contact with four inner wall surfaces of the space section of the rear frame of the footboard part, the elastic member absorbing the shocks depending on a direction of the shocks applied to the rear wheel part.

According to an embodiment of the present invention, the second link may have inwardly-rounded concave recesses on four surfaces consisting of a top surface, a bottom surface, and a pair of side surfaces, such that the elastic members are received by the concave recesses.

According to an embodiment of the present invention, the elastic members may be in a convex half moon shape such that the elastic members are in close contact with and supported by the concave recesses.

According to an embodiment of the present invention, the first link may be rotatably connected to the drive shaft of the rear wheel part.

Advantageous Effects

According to embodiments of the present invention, the separate suspensions are independently provided on both sides of the footboard part on which a rider stands in an upright position, such that the rider is protected from shocks from the road from traveling. It is therefore possible to improve safety by removing the worries of an injury and significantly improve customer satisfaction by increasing ride quality.

In addition, according to embodiments of the present invention, the suspensions are provided on the rear wheel parts that are disposed on both sides to face each other such that the separate suspensions are configured independent of each other. When shocks are applied to one of the rear wheel parts, the other one of the rear wheel parts is free from the influence of the shocks. This consequently realizes more improved ride quality.

BEST MODE

According to an embodiment of the present invention, an upright three-wheeled vehicle includes:

a pair of rear wheel parts disposed on both sides, the rear wheel parts facing each other;

a footboard part disposed between and connected to the pair of rear wheel parts, allowing a rider to put both feet thereon in an upright position, the footboard part having a space section of a predetermined size formed in a lateral direction within the footboard part;

a frame connecting a front section of the footboard part to a single front wheel part;

a handlebar part extending upward from the frame, the handlebar part controlling a direction in which the front wheel part rotates; and suspensions, each of the suspensions comprises: a first link perpendicularly connected to a drive shaft of a corresponding rear wheel part of the pair of rear wheel parts, the first link initially reducing delivery of shocks by rotating and reciprocating in a lateral direction when the rear wheel part moves up and down; a second link perpendicularly bent from the first link, the second link being accommodated within the space section in a rear frame of the footboard part, the second link secondarily reducing the shocks by absorbing a portion of the shocks directed to the footboard part; and an elastic member disposed on the second link, the elastic member being in close contact with four inner wall surfaces of the space section of the rear frame of the footboard part, the elastic member absorbing the shocks depending on a direction of the shocks applied to the rear wheel part.

MODE FOR INVENTION

Reference will now be made in detail to the present invention, embodiments of which are illustrated in the accompanying drawings. Reference should be made to the drawings, in which the same reference numerals and signs may be used throughout the different drawings to designate the same or similar components. In the following description of the present invention, detailed descriptions of known functions and components incorporated herein will be omitted in the case that the subject matter of the present invention is rendered unclear thereby.

It will be understood that, although terms "first," "second," "A," "B," "(a)," "(b)," etc. may be used herein to describe various elements, these terms are only used to distinguish one element from another element. The substance, sequence or order of these elements are not limed by these terms. It will be understood that when an element is referred to as being "connected to" or "coupled to" another element, not only can it be "directly connected" or "coupled to" the other element, but also can it be "indirectly connected or coupled to" the other element via an "intervening" element.

Figure 3:
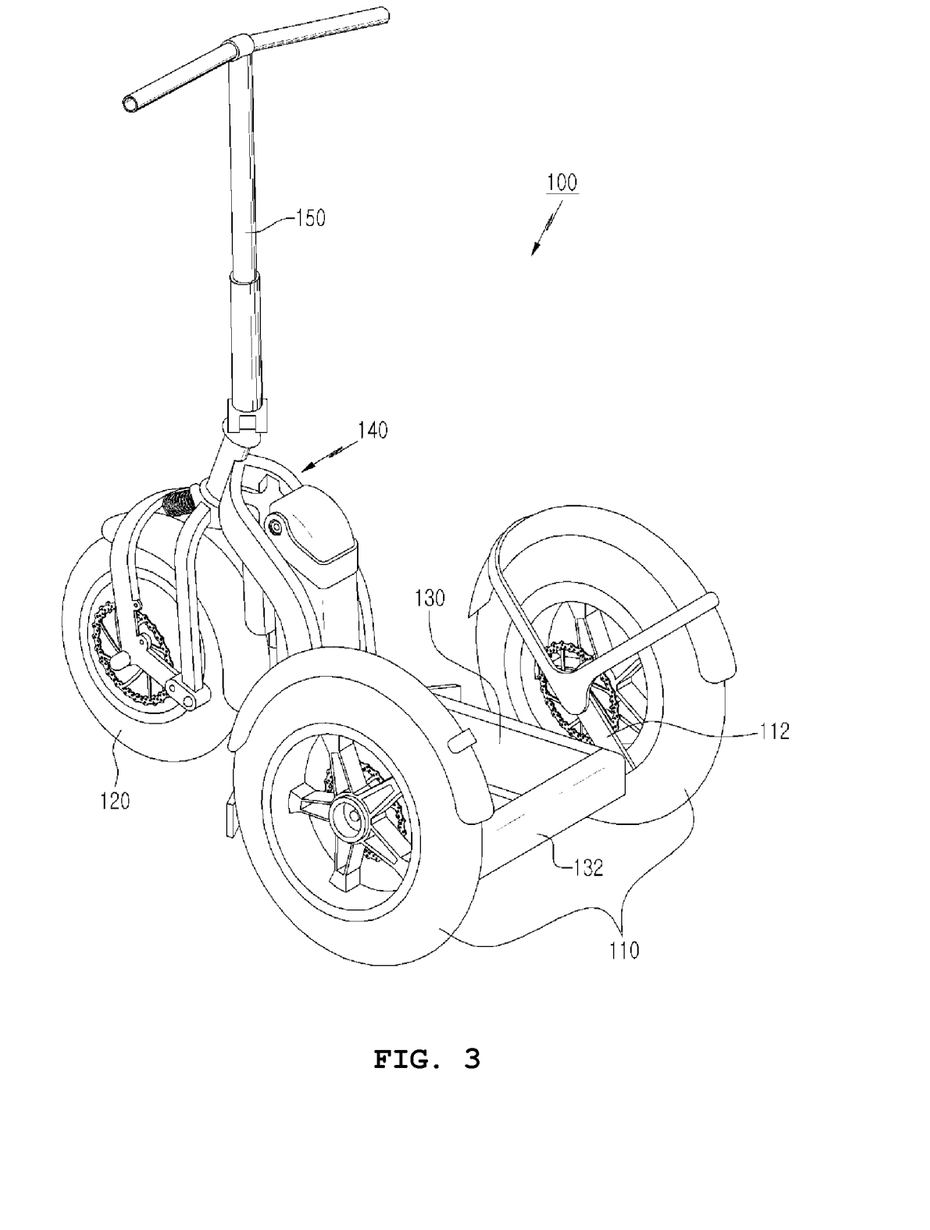
FIG. 3 is a perspective view illustrating an upright three-wheeled vehicle having a suspension according to an exemplary embodiment of the present invention.
Figure 4:
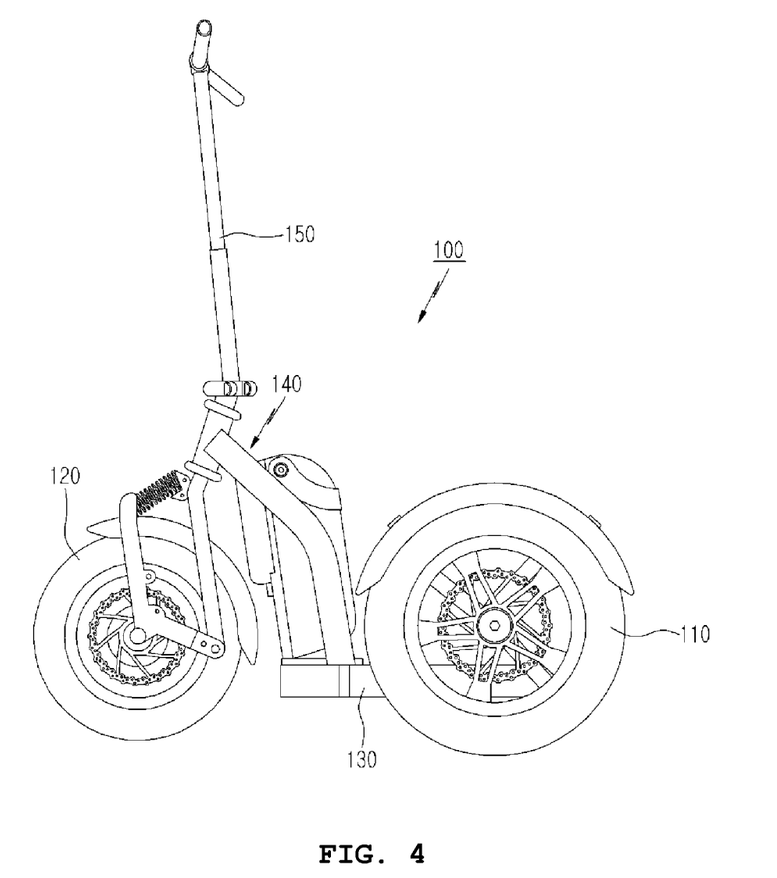
FIG. 4 and FIG. 5 are side and rear elevation views illustrating the upright three-wheeled vehicle having a suspension according to the exemplary embodiment of the present invention.
Figure 5:
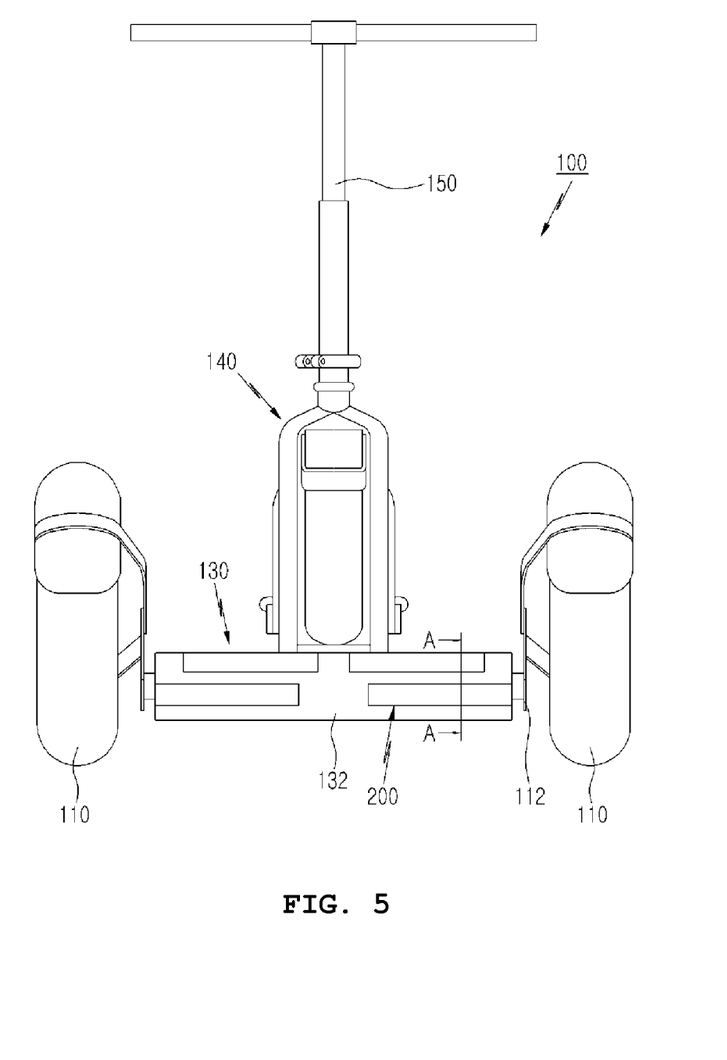
Figure 6:
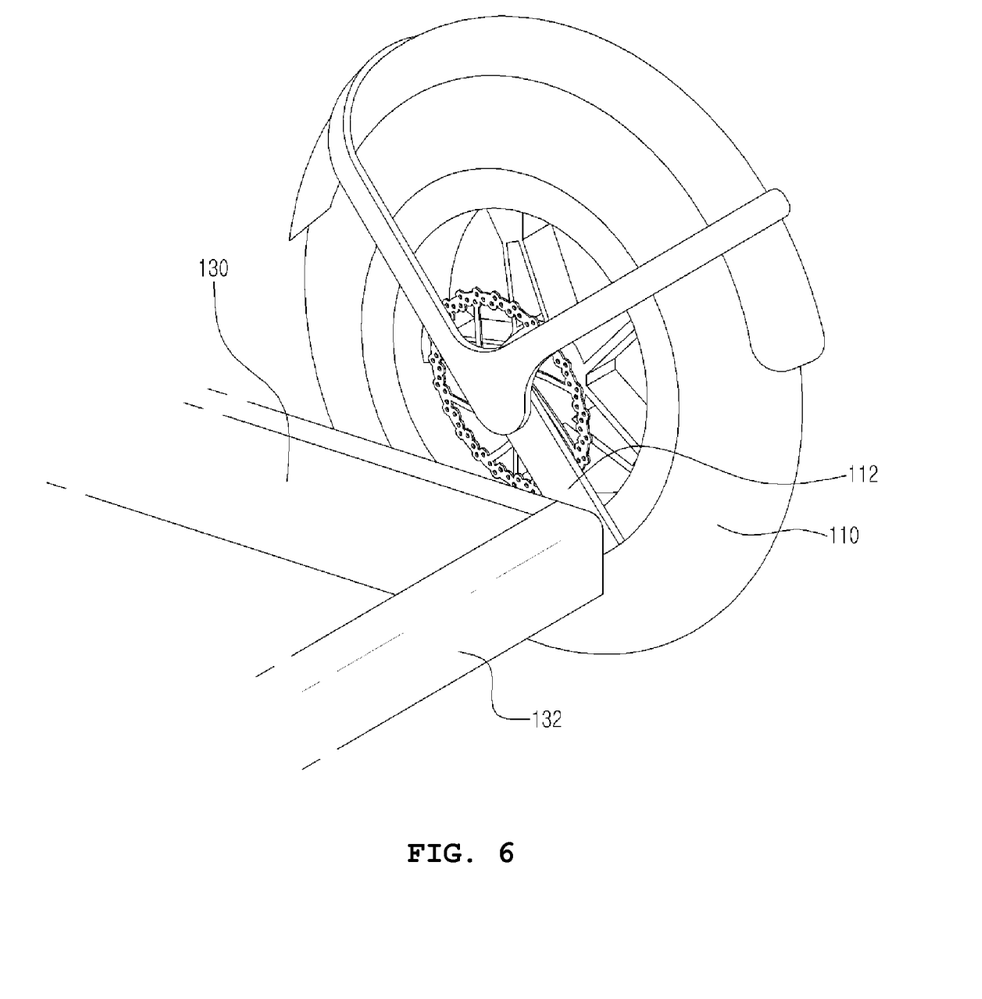
FIG. 6 is an enlarge view illustrating the rear wheel part and the footboard part on which the suspension according to the exemplary embodiment of the present invention is disposed.
Figure 7:
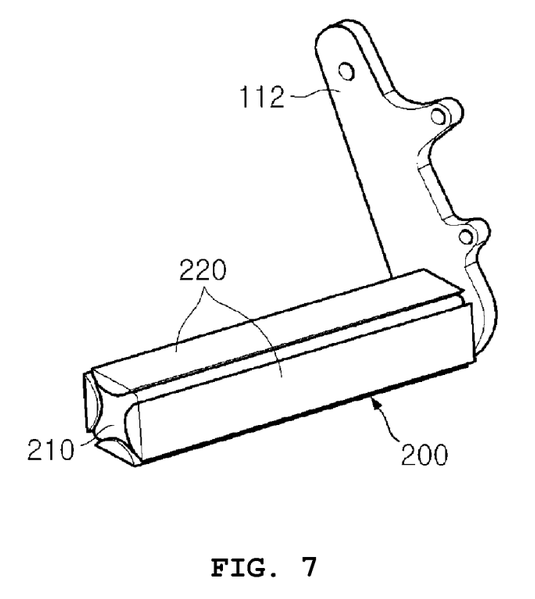
FIG. 7 is a perspective view illustrating the key parts of the suspension according to the exemplary embodiment of the present invention disposed on the rear wheel part and the footboard part.
Figure 8:
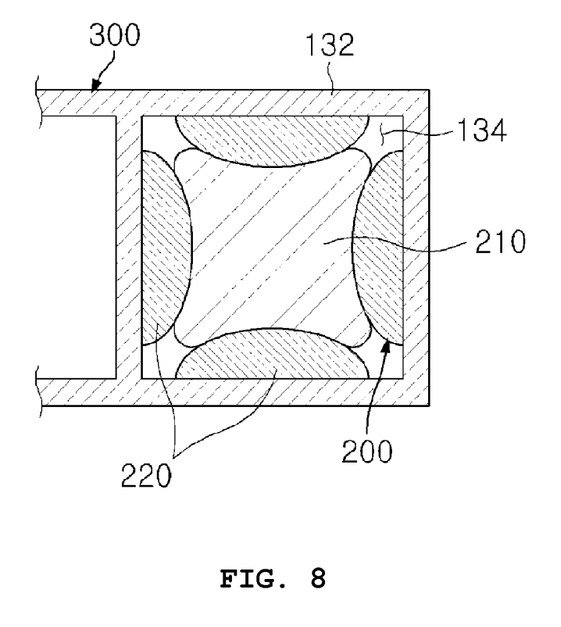
FIG. 8 is a cross-sectional view of the exemplary embodiment of the present invention taken along line A-A in FIG. 5.

FIG. 3 is a perspective view illustrating an upright three-wheeled vehicle having a suspension according to an exemplary embodiment of the present invention, FIG. 4 and FIG. 5 are side and rear elevation views illustrating the upright three-wheeled vehicle having a suspension according to the exemplary embodiment of the present invention, FIG. 6 is an enlarge view illustrating the rear wheel part and the footboard part on which the suspension according to the exemplary embodiment of the present invention is disposed, FIG. 7 is a perspective view illustrating the key parts of the suspension according to the exemplary embodiment of the present invention disposed on the rear wheel part and the footboard part, and FIG. 8 is a cross-sectional view of the exemplary embodiment of the present invention taken along line A-A in FIG. 5.

As illustrated in the drawings, an upright three-wheeled vehicle 100 having a suspension according to an exemplary embodiment of the present invention includes a pair of rear wheel parts 110, one front wheel part 120, a footboard part 130, a frame 140, and a handlebar part 150. The rear wheel parts 110 are disposed on both sides such that the rear wheel parts 110 face each other. The footboard part 130 is disposed between the both rear wheel parts 110, connecting the rear wheel parts 110, such that a rider puts both feet thereon in an upright position. The frame 140 connects the front section of the footboard part 130 to the front wheel part 120. The handlebar part 150 extends upward from the frame 140, and serves to control the direction in which the front wheel part 120 rotates.

The footboard part 130 is connected to the front wheel part 120 by means of the frame 140, and is connected to the rear wheel parts 110 by means of separate suspensions 200 that are ##independent of each other.

A space section 134 having a predetermined size is defined in a rear frame 132 of the footboard part 130 in the lateral direction. The space section 134 is connected to the drive shafts of the rear wheel parts 110 by means of the suspensions 200.

The footboard part 130 is positioned between the pair of rear wheel parts 110, connecting the rear wheel parts 110. The footboard part 130 is configured such that the rider stands in an upright position with both feet put on the footboard part 130, and that the space section 139 having a predetermined size is defined therein. The separate suspensions 200 are disposed within the space section 139, ##independent of the rear wheel parts 110.

As illustrated in FIG. 5 to FIG. 8, each of the suspensions 200 includes a first link 112 perpendicularly connected to the drive shaft of the corresponding rear wheel part 110 and a second link 210 perpendicularly bent from the first link 112. The second link 210 is accommodated within the space section 134 of the rear frame 132 of the footboard part 130.

It is preferable that the first link 112 is rotatably connected to the drive shaft of the rear wheel part 110. This configuration is intended to prevent the footboard part 130 from suddenly or quickly moving up and down following the rear wheel part 110 that moves up and down when traveling over irregular road surfaces.

In the suspensions 200 according to the present invention, the first link 112 is perpendicularly connected to the drive shaft of the corresponding rear wheel part. With this configuration, the first link 112 rotates and reciprocates in the lateral direction when the rear wheel part 110 suddenly or quickly moves up and down, thereby initially reducing the delivery of shocks.

In addition, the second link 210 accommodated within the space section 134 of the rear frame 132 has inwardly-rounded concave recesses (to which no reference numeral is assigned) on four sides consisting of a top surface, a bottom surface, and a pair of side surfaces. Convex elastic members 220 are sandwiched between the concave recesses and the inner wall surfaces of the space section 220. With this configuration, the four surfaces of the second link 210 are in close contact with the four inner wall surfaces of the space section 134 of the rear frame 132 of the footboard part 130.

Since the elastic members 220 of the suspension 200 are respectively disposed on the four surfaces of the second link 210 as above, each of the elastic members 220 serves to absorb shocks depending on the direction in which shocks are applied to the rear wheel part 110, thereby improving suspension performance.

For reference, according to the embodiment of the present invention, the second link 210 has been illustrated and described that the concave recesses are formed on the four surfaces thereof and each of the half moon-shaped convex elastic members 220 is in close contact with and supported by the corresponding concave recess. However, this is not intended to be limiting, and an integral structure can substitute for the elastic members 220 as long as the integral structure is in close contact with all of the four inner wall surfaces of the space section 134 of the rear frame 132 of the footboard part 130.

In addition, it is preferable that the suspensions 200 having the above-described structure be disposed on the pair of rear wheel parts 110 that face each other such that the suspensions 200 are independent of each other.

Reference will now be made to the operational relationship of the upright three-wheeled vehicle having the suspensions as configured above.

When the user standing in an upright position on the footboard part 130 starts the upright three-wheeled vehicle and operates the levers, the front wheel part 120 and the rear wheel parts 110 operate, causing the vehicle to travel.

In this state, when the upright three-wheeled vehicle 100 travels over a road having irregular surfaces, such as a dirt road, or hits a hole or a raised spot, the front wheel part 120 and the rear wheel parts 110 suddenly or quickly move up and down. Since both feet of the rider are put on the portions of the rear section of the footboard part 130 to which the rear wheels 110 are connected by means of the suspensions 200, shocks caused by upward-downward motions are reduced by the suspensions 200.

Since the first link 112 of the suspensions 200 connecting the footboard part 130 to the rear wheel part 110 can rotate perpendicular to the drive shaft of the rear wheel part 110, the first link 112 rotates and reciprocates in the lateral direction when the rear wheel part 110 suddenly or quickly moves up and down. In this manner, the first link 112 stays in position without following the motions of the rear wheel part 110, thereby initially reducing the delivery of shocks.

In addition, a portion of shocks directed to the footboard part 130 is absorbed by the second link 210 accommodated within the space section 134 of the rear frame 132 of the footboard part 130, in the direction perpendicular to the first link 112, and the elastic members 220 held by the concave recesses of the second link 210 and the four inner wall surfaces of the space section 134 of the rear frame 132 of the footboard part 130. In this manner, the delivery of shocks is reduced again.

In particular, since the elastic members 220 are disposed on the four surfaces independently of each other, the elastic members 220 can absorb shocks delivered from the rear wheel parts regardless of the direction of shocks.

Accordingly, when shocks are delivered from road surfaces while the rider is traveling in an upright position on the three-wheeled vehicle 100 with both feet put on the footboard part 130, a significant amount of shocks is reduced by the suspensions 200 before being delivered to the footboard part 130. The amount of shocks delivered to the rider riding in the upright position on the footboard part 130 is consequently reduced. This consequently protects the joint, the waist, and the like of the rider from an excessive load, thereby not only removing the worries of an injury, but also significantly increasing ride quality.

In particular, according to the present invention, the suspensions 200 are provided on the pair of rear wheel parts 110 that face each other such that the suspensions 200 are independent of each other. This configuration prevents shocks applied to one of the rear wheel parts from being delivered to the other one of the rear wheel parts, thereby realizing more improved suspension performance.

The suspensions 200 according to the present invention are independently provided on the left rear wheel part and the right rear wheel part, such that shocks applied to one of the rear wheel parts are absorbed independently of the other one of the rear wheel parts. That is, this configuration prevents shocks applied to the left wheel part from being delivered to the right wheel part.

Although all of the elements of the foregoing embodiment of the present invention have been described as being assembled into and operating as one unit, the present invention is not limited thereto. One or more of these elements can be selectively coupled together and operate as one unit without departing from the principle of the present invention.

It will be understood that the terms "comprise", "include", and "have", used herein specify the presence of stated elements but do not preclude the presence or addition of any other elements unless explicitly noted. Unless otherwise defined, all terms including technical and scientific terms used herein have the same meaning as commonly understood by a skilled person in the art to which the present invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The foregoing descriptions and the accompanying drawings have been presented in order to explain the certain principles of the present invention. A person skilled in the art to which the present invention relates can make many modifications and variations by combining, dividing, substituting for or changing elements without departing from the principle of the invention. The foregoing embodiments disclosed herein shall be interpreted as illustrative only not as limitative of the principle and scope of the invention. It should be understood that the scope of the invention shall be defined by the appended Claims and all of their equivalents fall within the scope of the invention.

INDUSTRIAL APPLICABILITY

According to the present invention, the suspensions 200 are provided on the pair of rear wheel parts 110 that face each other such that the suspensions 200 are independent of each other. This configuration prevents shocks applied to one of the rear wheel parts from being delivered to the other one of the rear wheel parts, thereby realizing more improved suspension performance.

<Description of the Reference Numerals in the Drawings>

| | |
|---|---|
| 100: three-wheeled vehicle | 110: rear wheel part |
| 112: first link | 120: front wheel part |
| 130: footboard part | 132: rear frame |
| 134: space section | 140: frame |
| 150: handlebar part | 200: suspension |
| 210: second link | 220: elastic member |

What is claimed is:

1. An upright three-wheeled vehicle comprising:
   a pair of rear wheel parts disposed on both sides, the rear wheel parts facing each other;
   a footboard part disposed between and connected to the pair of rear wheel parts, allowing a rider to put both feet thereon in an upright position, the footboard part having a space section of a predetermined size formed in a lateral direction within the footboard part;
   a frame connecting a front section of the footboard part to a single front wheel part;
   a handlebar part extending upward from the frame, the handlebar part controlling a direction in which the front wheel part rotates; and
   suspensions, each of the suspensions comprises: a first link perpendicularly connected to a drive shaft of a corresponding rear wheel part of the pair of rear wheel parts, the first link initially reducing delivery of shocks by rotating and reciprocating in a lateral direction when the rear wheel part moves up and down; a second link perpendicularly bent from the first link, the second link being accommodated within the space section in a rear frame of the footboard part, the second link secondarily reducing the shocks by absorbing a portion of the shocks directed to the footboard part; and an elastic member disposed on the second link, the elastic member being in close contact with four inner wall surfaces of the space section of the rear frame of the footboard part, the elastic member absorbing the shocks depending on a direction of the shocks applied to the rear wheel part.

2. The upright three-wheeled vehicle according to claim 1, wherein the second link has inwardly-rounded concave recesses on four surfaces consisting of a top surface, a bottom surface, and a pair of side surfaces, such that the elastic members are received by the concave recesses.

3. The upright three-wheeled vehicle according to claim 1, wherein the first link is rotatably connected to the drive shaft of the rear wheel part.

4. The upright three-wheeled vehicle according to claim 2, wherein the elastic members are in a convex half moon shape such that the elastic members are in close contact with and supported by the concave recesses.

\* \* \* \* \*